(12) United States Patent  
Capenos

(10) Patent No.: US 7,498,686 B2  
(45) Date of Patent: Mar. 3, 2009

(54) AUXILIARY VEHICLE LIGHT APPARATUS

(76) Inventor: Mark R. Capenos, 114 Knoll La., West Newton, PA (US) 15089

( * ) Notice: Subject to any disclaimer, the term of this patent is extended or adjusted under 35 U.S.C. 154(b) by 152 days.

(21) Appl. No.: 11/800,234

(22) Filed: May 4, 2007

(65) Prior Publication Data

US 2008/0272699 A1    Nov. 6, 2008

(51) Int. Cl.
*B60L 1/14* (2006.01)
(52) U.S. Cl. .................. 307/9.1; 307/10.1; 362/485
(58) Field of Classification Search ............ 307/9.1, 307/10.1; 362/485; 315/83; 340/431
See application file for complete search history.

(56) References Cited

U.S. PATENT DOCUMENTS

| | | | | |
|---|---|---|---|---|
| 5,473,306 | A * | 12/1995 | Adell | 340/468 |
| 5,923,124 | A * | 7/1999 | Paech | 315/80 |
| 6,025,778 | A * | 2/2000 | Dietz et al. | 340/463 |
| 6,788,190 | B2 * | 9/2004 | Bishop | 340/435 |
| 7,233,230 | B2 * | 6/2007 | Drummond et al. | 340/425.5 |

* cited by examiner

Primary Examiner—Albert W Paladini

(57) ABSTRACT

This invention comprises an auxiliary light apparatus for use in combination with a backup light apparatus of a truck or other vehicle. The auxiliary light apparatus comprises a male or female electrical plug for connection to a mating plug on the original vehicle backup light apparatus; an electrical voltage relay element in the auxiliary plug apparatus; a toggle switch in the auxiliary apparatus and auxiliary lights mounted on the vehicle. The auxiliary lights function simultaneously with the original vehicle backup lights in response to activation of the reverse gear apparatus of the vehicle transmission, with the voltage relay acting to deliver sufficient voltage to activate both the original vehicle backup lights and the auxiliary lights. In another embodiment of the invention, the toggle switch is closed to access directly the vehicle 12 volt source to power the auxiliary lights for use as work lights, even when the vehicle reverse gear is not engaged. Another embodiment of the invention comprises a pass-through auxiliary connector having a towed vehicle auxiliary connector plug end opposite the auxiliary plug end connected to the towing vehicle, which towed vehicle auxiliary connector plug includes a plurality of either pin or blade female connection apertures, or male connector pins or blades, adapted to receive a mating connector from a towed vehicle.

7 Claims, 4 Drawing Sheets

AUXILIARY VEHICLE LIGHT APPARATUS

BACKGROUND OF THE INVENTION

1. Field of the Invention

The present invention relates to an auxiliary light apparatus for use in combination with an electric power supply outlet and plug apparatus commonly mounted on the rear of a truck or other vehicle to provide electric power to the vehicle backup lights and to provide an electric power source connection for trailers or other vehicles connected to the truck for towing or other purposes.

2. Description of the Prior Art

Many present day trucks and similar vehicles are equipped with electrical outlet apparatus and receptacles, usually including a female plug, mounted in or on the rear of the vehicle. Such prior art apparatus often is employed to supply electric power to the vehicle backup lights, usually at a current lower than the maximum current available from the twelve volt vehicle power supply. Often illumination provided by the original backup light apparatus is not adequate for the conditions presented by the environment in which the vehicle is used. In addition, the current supplied by such original backup light apparatus is not sufficient to provide illumination from the vehicle backup lights to provide a well illuminated working environment outside the vehicle.

A number of prior patents disclose adapter apparatus to connect an outlet plug on a towing vehicle to the electrical system of a towed vehicle. None of those references discloses a combination of apparatus elements adapted to provide auxiliary rear power or light assemblies on the towing vehicle when operating from the power source of the towing vehicle. For example, U.S. Patent Application Publication No. U.S. 2005/0152145, issued to Currie et al on Jul. 14, 2005, describes an adapter plug connected to the existing tail light plug or trailer hitch plug of a towing vehicle and also connected to the twelve volt power supply of the towing vehicle through electrical components and circuitry adapted to lower the voltage delivered to the towed vehicle to operate light emitting diodes (LEDs) and other low voltage electrical elements and components. The adapter plug module can be activated by the park light voltage or the tail light voltage or, alternatively, may be separately operated by a manual switch. The adapter may operate LEDs and other low voltage equipment on the towing vehicle. The adapter plug may contain seven prongs. That publication does not disclose apparatus for providing a higher operating current through the vehicle rear electrical connection apparatus; does not disclose apparatus responsive to activation of the reverse gear of the vehicle and does not disclose apparatus capable of delivery of increased current to a vehicle rear light assembly separately operable as work lights.

U.S. Pat. No. 5,626,479, issued May 6, 1997 to Hughes, describes a unified connector interface adapter including a plurality of pins or blades providing a greater number of heavier electrical interconnections to accommodate the more complex accessories included in a towed vehicle, such as electrical braking systems, separate air conditioners, stoves and refrigerators. That patent does not disclose auxiliary apparatus for use in combination with the vehicle rear electrical connection apparatus which is activated by engagement of the vehicle reverse gear; which includes provision of additional auxiliary lights for back-up illumination; or which provides separately operable activation of the auxiliary lights as work lights at the rear of the vehicle.

U.S. Pat. No. 6,749,438, issued Jun. 15, 2004 to Scheller, et al, describes an electrical interface device for coupling with an existing master connector mounted on a towing vehicle to allow for connection of the electrical systems of differently configured towed vehicles without modification of the interface device. That patent also describes an electrical interface connecting device which includes a central terminal and six circularly arranged terminals disposed about a central terminal. That patent describes further an electrical connection adapter having one end adapted to engage with the electrical connection apparatus on a towing vehicle and having the other end of different configuration adapted for connection to the electrical connection apparatus on a towed vehicle. That patent does not describe auxiliary apparatus for combination, with the existing electrical outlet apparatus on a towing vehicle, of auxiliary light apparatus adapted to provide greater back-up illumination; adapted for activation by engagement of the vehicle reverse transmission gear; and separately operable to provide work lights powered by the towing vehicle twelve volt system even when the vehicle reverse gear is not engaged.

U.S. Pat. No. 5,443,389, issued Aug. 22, 1995 to Hughes, discloses a unified connector apparatus between the electrical system of a towing vehicle and the electrical system of towed vehicle, including 6 or 7 pin or blade connectors adapted to energize an electrical braking system, separate air conditioners, stoves and refrigerators on the towed vehicle, all requiring higher electrical currents and power. That patent does not describe an auxiliary light and connector apparatus adapted for use in combination with the existing electrical connection apparatus on a vehicle to provide auxiliary back-up lights and illumination responsive to engagement of the vehicle's reverse transmission gear, and also containing a switch element to enable separate operation of the auxiliary lights to provide illumination of a work area without engagement of the vehicle reverse gear.

Accordingly, a need exists for auxiliary light apparatus for use in combination with existing vehicle backup light and trailer electrical connection apparatus to provide additional backup lights and exterior work lights that provide greater illumination than that provided by the original vehicle equipment.

It is an object of the present invention to provide auxiliary light apparatus that is easily and readily connected in combination with the original vehicle backup light and trailer electrical connection apparatus without use of complicated, difficult and expensive additional wiring and modifications of the vehicle electrical system.

It is a further object of the present invention to provide auxiliary light apparatus for vehicles for use in combination with the original backup light and trailer electrical connection apparatus, which auxiliary light apparatus includes a selectively operable switch element that enables use of brighter auxiliary vehicle lights as work area lights capable of operating independently of the vehicle backup lights and without activation of the vehicle reverse gear.

It is another object of the present invention to provide auxiliary light apparatus for vehicles in use in combination with the original back-up light and trailer electrical connection apparatus, which auxiliary light apparatus includes pass-through connector apparatus which provides not only auxiliary light apparatus and auxiliary lights for increased back-up light illumination and for separately operable work light illumination, but also can be installed and used simultaneously as an electrical connector apparatus between a towing vehicle and a connected towed vehicle.

SUMMARY OF THE INVENTION

According to the present invention, there is provided an auxiliary light apparatus for use in combination with the existing vehicle back-up light and trailer electrical supply apparatus, which auxiliary light apparatus includes, and enables the use of, auxiliary back-up lights which can be activated selectively, either simultaneously with the original back-up lights in response to engagement of the vehicle reverse gear or, alternatively, can be operated separately by operation of a switch to enable use of the auxiliary lights as work area lights, operating when the vehicle reverse gear is not engaged. Another embodiment of the present invention includes, in combination with the auxiliary light apparatus, pass-through plug apparatus including the auxiliary plug apparatus and auxiliary lights and relay and switch at one end of that apparatus and, at the other end of the auxiliary apparatus, a towed vehicle auxiliary electrical connector apparatus having either male or female electrical connector elements adapted to receive the electrical connector of a towed vehicle.

BRIEF DESCRIPTION OF DRAWINGS

The present invention can be understood more fully when the following description is read in light of the accompanying drawings in which.

DETAILED DESCRIPTION OF THE INVENTION

Figure 1:
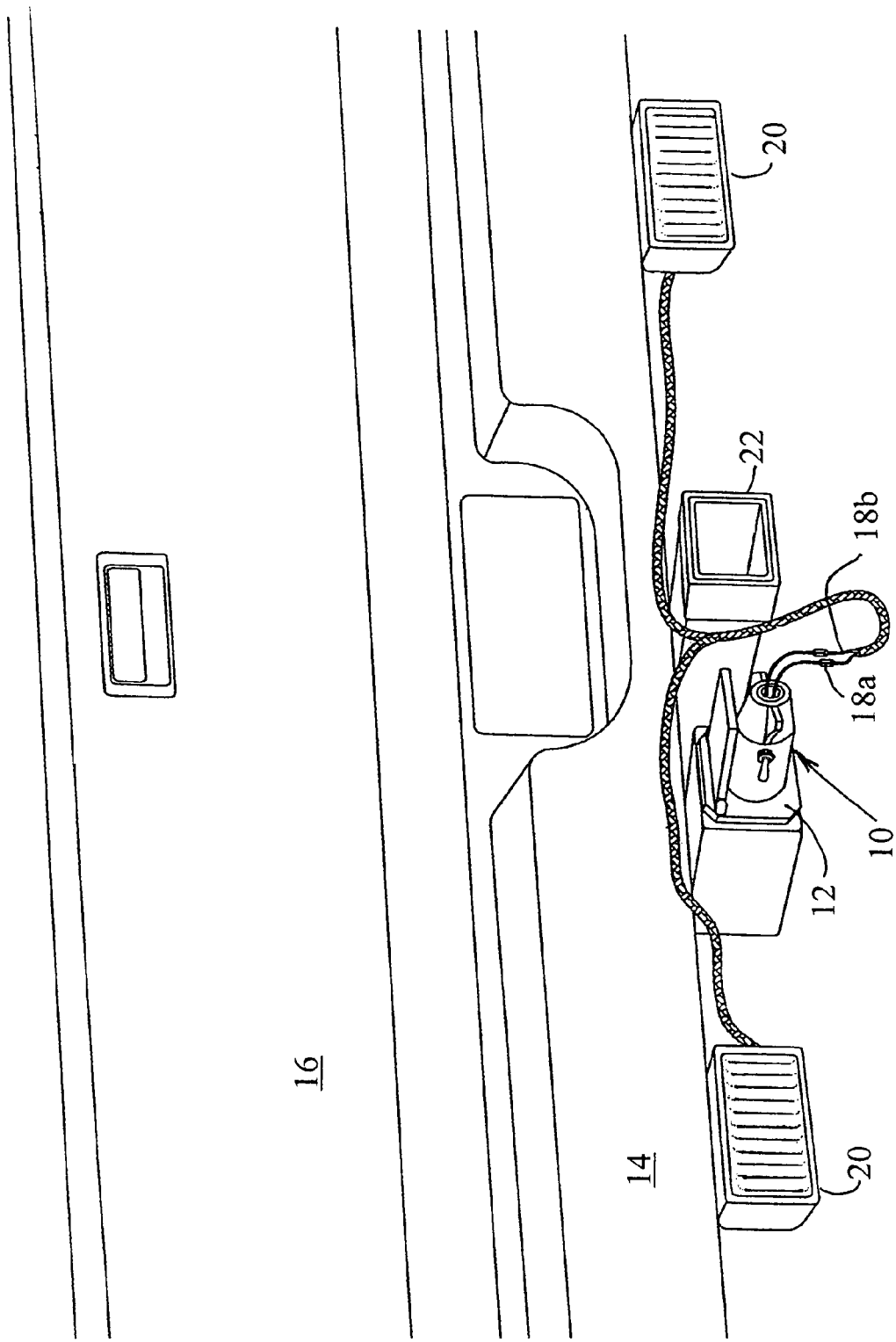
FIG. 1 is an illustration of the rear end and rear bumper assembly of a vehicle having the auxiliary lighting apparatus of this invention connected in combination with the original back-up light and towing electrical connector receptacle and with the auxiliary back-up lights installed under the rear vehicle bumper.

FIG. 1 depicts the auxiliary light apparatus of this invention, indicated generally by reference numeral 10, connected to the original vehicle electrical outlet connector apparatus 12 on the rear bumper 14 of a vehicle 16. The towing vehicle hitch 22 is connected to the vehicle bumper 14 adjacent auxiliary light apparatus 10 and original vehicle outlet connector apparatus 12. A pair of auxiliary lights 20 are connected by electrical cables 18a and 18b to the auxiliary light apparatus 10.

Figure 2:
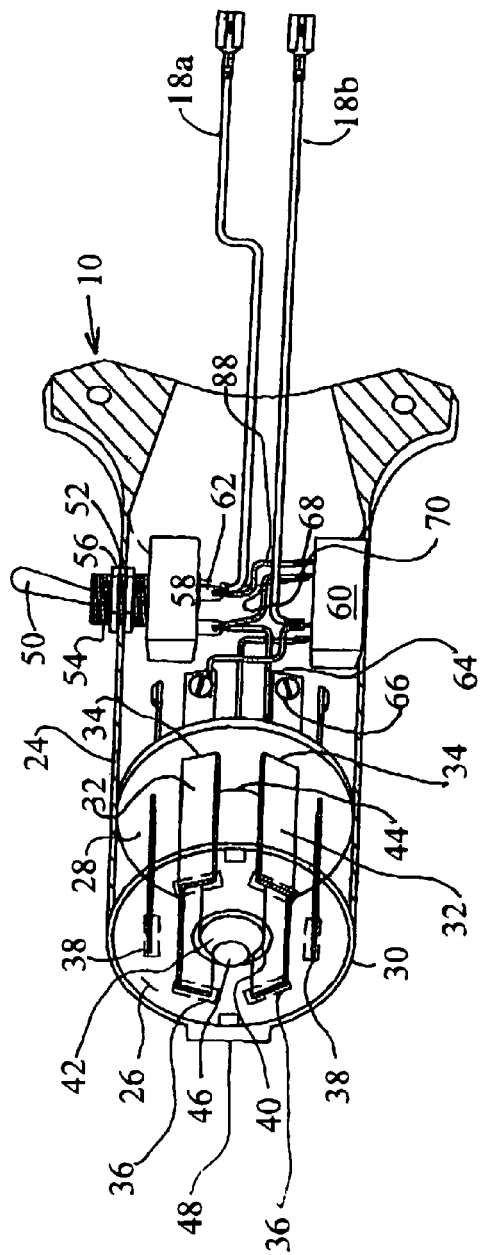
FIG. 2 is an isometric view, partially in longitudinal cross-section, of the auxiliary light apparatus of this invention.

FIG. 2 is an isometric depiction, partially in longitudinal cross-section, of the auxiliary light apparatus 10, including a hollow cylindrical housing 24. Although housing 24 is depicted in FIG. 1 as cylindrical, it is within the concept of this invention that housing 24 can have a polygonal shape in other embodiments of this invention.

An end plate 26 is mounted in one end of housing 24 and has formed therein a central aperture 40 and a plurality of connector member apertures 38, mutually spaced around end plate 26 and central aperture 40. A first connector plate 28 is mounted within housing 24 and spaced longitudinally from end plate 26. A connector guide 44 is connected to connector plate 28 and extends through the central aperture 40 in end plate 26. A flat end surface 46 and a contiguous truncated conical surface 42 are formed on the end of connector guide 44 distal from connector plate 28 and extending through the central aperture 40 of end plate 26 to guide and support the auxiliary apparatus housing 24 in engagement and electrical connection with the towing vehicle connector apparatus 12. A plurality of electrical connector blades 32 are each secured in one of a plurality of apertures 34 through connector plate 28, with one end of each connector blade 32 extending into an aperture 36 in end plate 26. The connector blades 32 are mutually spaced around connector guide 44, with the end of each connector blade 32 enclosed in an aperture 36 in end plate 26 and constructed and arranged to engage a corresponding electrical connector contained in the towing vehicle connector apparatus 12.

Figure 3:
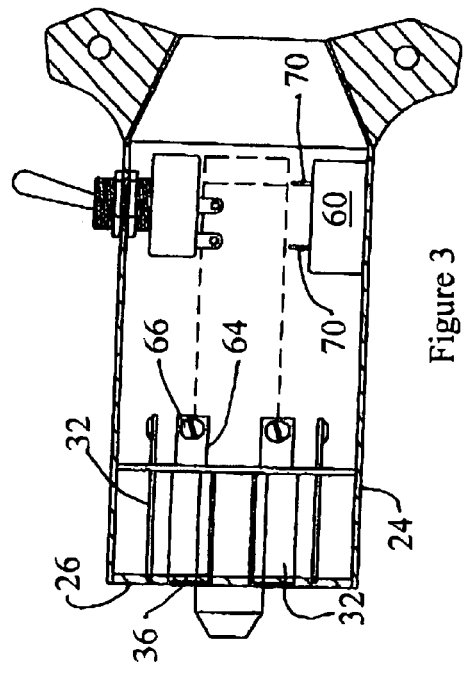
FIG. 3 is a longitudinal cross-section view of the apparatus of this invention.
Figure 4:
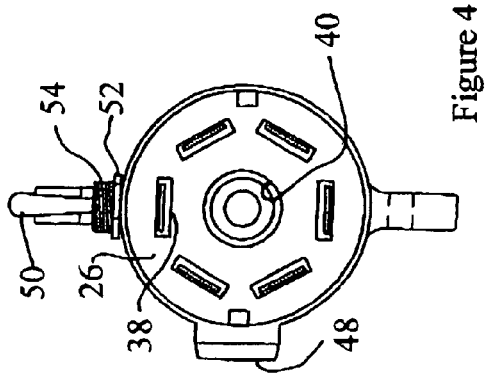
FIG. 4 is an end view of the apparatus of this invention.

FIGS. 2, 3 and 4 depict a structure and arrangement of a plurality of connector blades 32 in which six connector blades are arranged in mutually spaced configuration that can be either circular or hexagonal and equally spaced around connector guide 44.

FIGS. 2 and 3 depict an embodiment of this invention in which each of the connector blades 32 extends into, but not completely through, an aperture 36 in end plate 26. That embodiment of this invention is adapted for use with towing vehicle connector apparatus having corresponding electrical connectors constructed and arranged to accommodate the compatible configuration of the connector guide 44 and connector blades 32 as depicted in FIG. 2 and FIG. 3. It is within the scope and concept of the present invention that the shape, configuration, pattern, length and extension of the connector blades 32 can be selected to provide a different number of connectors 32, different shapes of connectors blades 32, a different circumferential configuration of the connectors 32, and different lengths of the connectors 32, to accommodate the shape, arrangement and configuration of various electrical connection apparatus 12 provided on the towing vehicle. It is also within the further scope and concept of the present invention that the shape of the connecting apparatus depicted in FIG. 2 and FIG. 3 as the connector blades 32 can be varied and provided as either cylindrical connector pins or connector blades having a polygonal peripheral shape other than the rectangular shape depicted in the drawings. It is also within the scope and concept of this invention that, in those circumstances in which the electrical connector members on the connector apparatus 12 on the vehicle are male connector members, the structure and configuration of connector blades 32 can be constructed to provide a mating receptacle type connector such as a connector sleeve, or connector tube, or a pair of opposed connector spring members that are mutually displaced from each other for receiving engagement of the opposing connector pin or blade on the original vehicle. An alignment tab 48 extends outwardly from the end of housing 24 contiguous to end plate 26.

As shown in FIG. 2 and FIG. 3, a threaded fastener 66 is secured in the end 64 of each of the connector blades 32, at the end 64 of that blade distal from the end plate 26. A toggle switch 50 is secured in an externally threaded body member 54 mounted in, and extending through, an aperture 52 in the housing 24. A pair of lock washers 56 threadably engage the body 54 of toggle switch 50 on either of the exterior and interior sides of the adapter wall 24. Toggle switch 50 may extend from the circumference of the housing 24 in any direction that is constructed and arranged to accommodate the orientation, whether left handed, right handed, or in-line, of insertion of the auxiliary light apparatus 10 into the towing vehicle electrical outlet connector apparatus 12. Toggle switch 50 includes a wiring block 58 having a plurality of connector terminals 62 extending outwardly from wiring block 58. The wiring block connectors 62 are connected by a plurality of wires 68 to connector terminals 70 on a relay switch 60 mounted on the interior wall of housing 24 opposite wiring block 58 of toggle switch 50. The appropriate connecting terminals of toggle switch wiring block 58 and 60 are connected by electrical wires to the appropriate blade ends 64 and screws 66 which communicate with the vehicle power supply 12 volt constant hot terminal and the vehicle power supply ground terminal. In each instance of use, the proper blade connections are determined by the configuration on the vehicle power source terminals for the constant hot terminal and the ground terminal. As shown in FIG. 1 and FIG. 2, the auxiliary light power cables 18a and 18b are connected between the auxiliary lights and the appropriate connection terminals located on toggle switch wiring block 58 and the relay switch 60.

Figure 5:
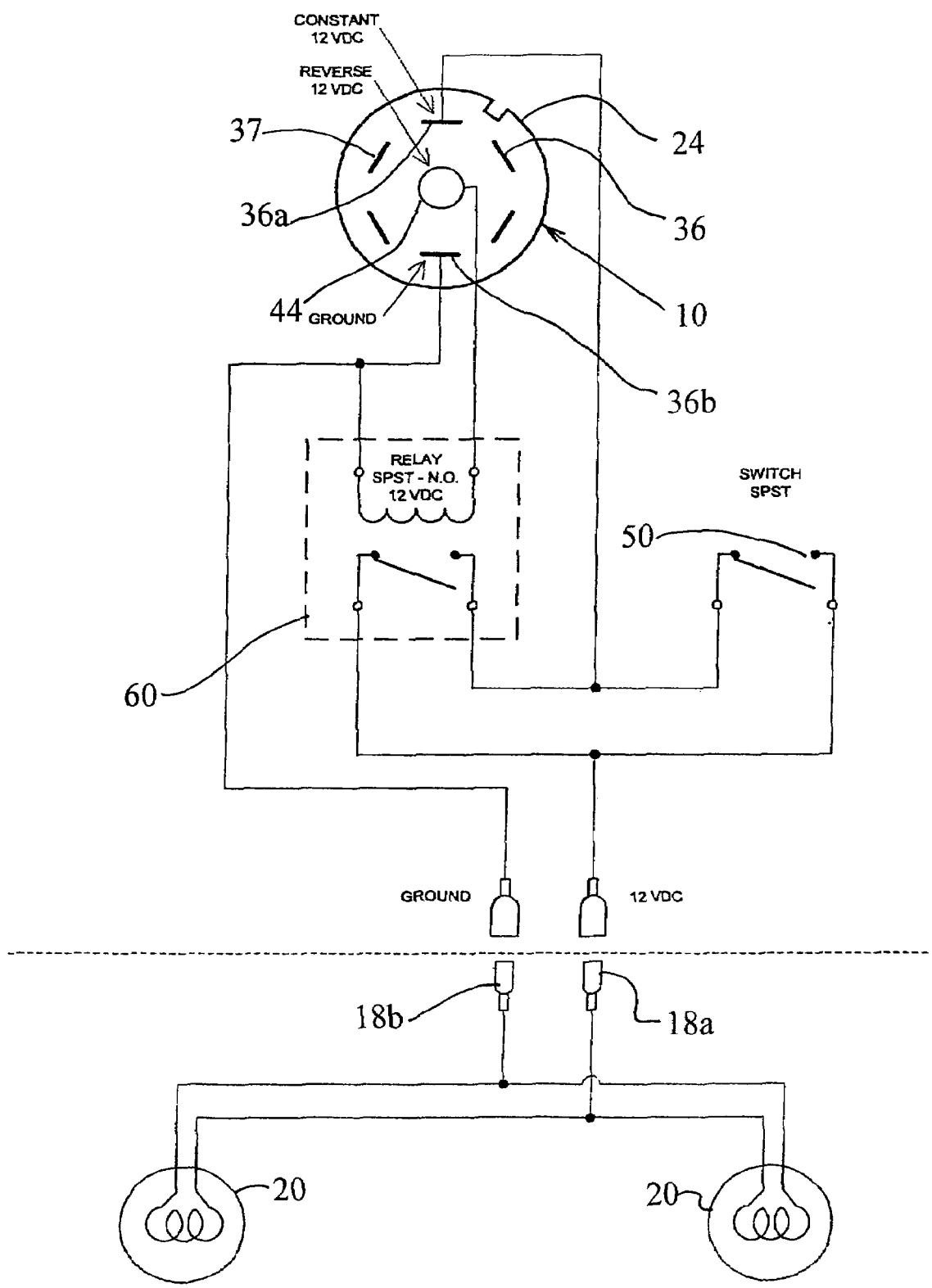
FIG. 5 is an electrical circuit diagram of the auxiliary connector and light apparatus of this invention.

Electrical connection of the elements of the apparatus of this invention can be explained further by reference to the circuit diagram presented in FIG. 5, wherein the auxiliary connector apparatus 10 housing 24 contains a plurality of connector blades 36 including a constant 12 volt source terminal blade 36a and a constant ground terminal blade 36b. The connector guide 44 functions as a connection terminal for selective delivery of the 12 volt supply current when the vehicle reverse gear is engaged. With toggle switch 50 in the open position as shown in FIG. 5, engagement of the vehicle reverse gear energizes relay 60 to close the relay switch and provide a constant 12 volt current to auxiliary light cables 18a and 18b and auxiliary lights 20. When the vehicle reverse gear is not engaged and relay 60 is not energized, toggle switch 50 can be closed to provide a constant 12 volt source to the auxiliary lights, thus enabling their use as work lights when the vehicle reverse gear is not engaged. In another embodiment of this invention, toggle switch 50 is a 3-position switch, with one switch position selected to disable activation of the auxiliary lights 20 when the vehicle reverse gear is engaged, without connecting the auxiliary light to the constant voltage source.

Figure 6:
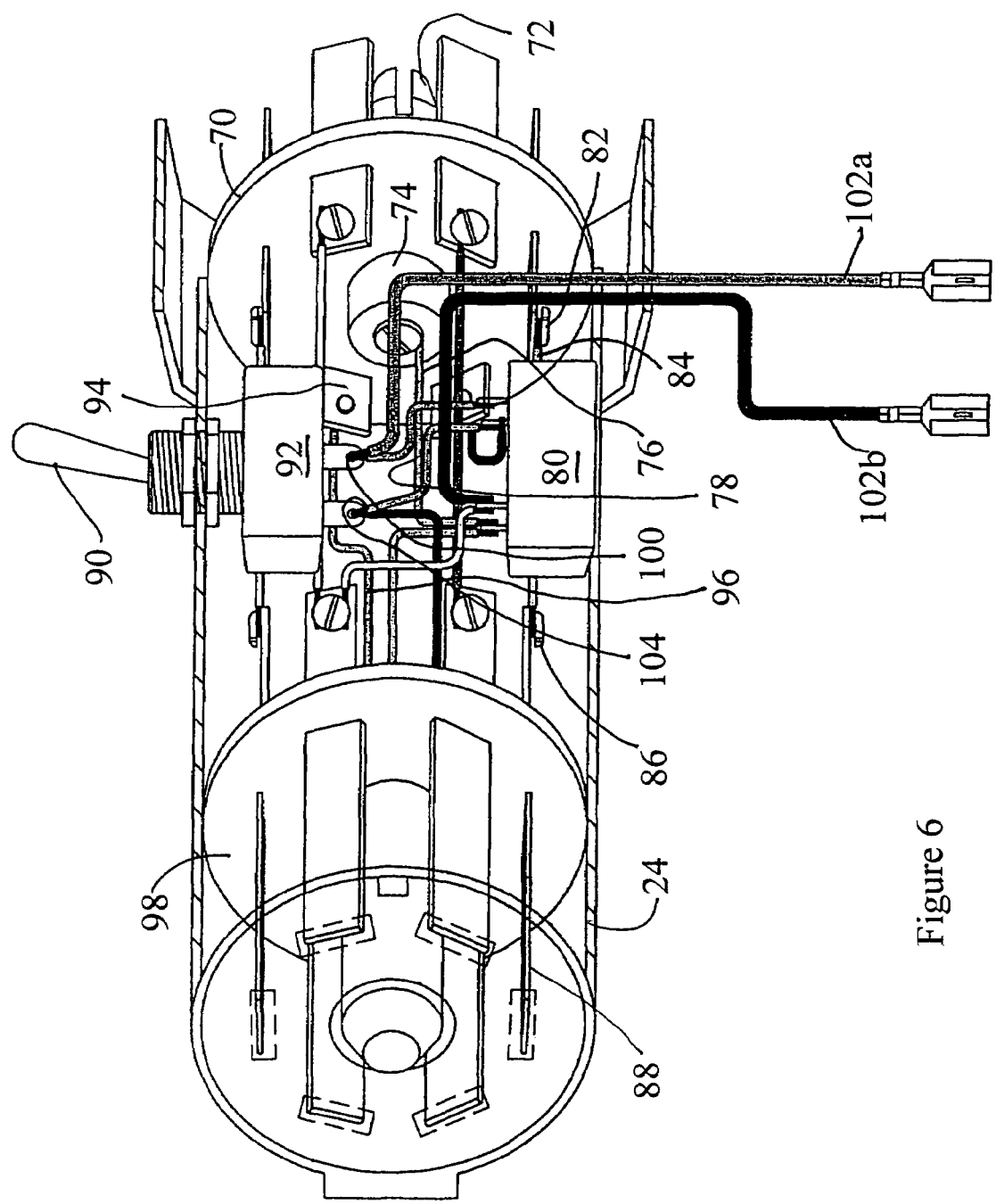
FIG. 6 is an isometric view, partially in longitudinal cross-section, of another embodiment of this invention, including the auxiliary light apparatus of the invention and a pass-through electrical connector apparatus having a plurality of blades constructed and arranged to engage a female connector apparatus on a towed vehicle.

FIG. 6 depicts another embodiment of this invention in which the auxiliary light apparatus depicted in FIGS. 1 through 5 is combined with additional apparatus, as depicted in FIG. 6, comprising pass-through auxiliary connector apparatus which enables connection of the original towing vehicle and electrical connection apparatus through the auxiliary light apparatus of this invention to the electrical connection apparatus on a towed vehicle such as a house trailer or boat trailer or other vehicle. In the pass-through device as depicted in FIG. 6, a pass-through support plate 70 is mounted in housing 24 of auxiliary apparatus 10 in the end of housing 24 opposite, and distal from, the towing vehicle. A pass-through connector guide 72 is secured within a central aperture 74 formed in pass-through support plate 70. The interior end 74 of connector guide 72 is connected by wiring 78 to the reverse gear voltage source of the vehicle and to the relay switch 80. A pass-through ground terminal 82 mounted on pass-through connector plate 70 is connected by wiring 84 to ground terminal 86 of the auxiliary light connector blade 88. A toggle switch 90 terminal block 92 is connected at terminal 94 by wiring 96 to the constant hot voltage supply terminal on support plate 98 of the auxiliary light apparatus. The toggle switch terminal 100 delivers current from the constant hot voltage vehicle power supply through wiring 102a and 102b to the auxiliary light system and delivers constant current through wiring 104 to the electrical connection apparatus of the towed vehicle.

Although this novel invention and its several embodiments have been fully disclosed and described herein, numerous modifications and adaptations will become readily apparent to one of ordinary skill in this art, and such adaptations and modifications are intended to be included within the scope of the following claims.

I claim:

1. An auxiliary lighting and electrical connector apparatus for connection to the rear electrical connector apparatus on a vehicle, which auxiliary apparatus comprises:
   (a). A housing, and
   (b). At least one support member secured within said housing and having formed in said support member a plurality of apertures, each adapted to receive one of a plurality of electrical connecting members, and
   (c). A first electrical connecting member secured within, and extending through, said support member and connected with the vehicle operating power source activated by engaging the reverse gear of the vehicle, and
   (d). A second electrical connecting member mounted and extending through an aperture of said support member and connected to a constant maximum voltage power source, and
   (e). A third electrical connecting member mounted in and extending through an aperture of said support member and connected to the ground circuit of the vehicle operating power source, and
   (f). At least one additional electrical connecting member secured within and passing through said support member and connected to the vehicle operating power source and
   (g). An electrical relay switch apparatus connected to both of the said reverse gear actuated power circuit and the said constant maximum voltage vehicle power circuit and constructed and arranged to deliver full operating current from the vehicle power system when the vehicle reverse gear is engaged, and
   (h). At least one auxiliary light mounted on the vehicle and connected to the maximum voltage output circuit of said relay.

2. The auxiliary lighting and connector apparatus as set forth in claim 1 and including
   a second switch apparatus connecting said auxiliary light directly to the constant full voltage source of the vehicle power supply and by-passing said relay switch, and
   said second switch being constructed and arranged for selective operation of said second switch to by-pass said relay switch and enable activation of said auxiliary light without engagement of the vehicle reverse gear.

3. Vehicle lighting and electrical connection apparatus comprising a combination of,
   (a). A vehicle having a primary electrical power source, and
   (b). An electrical circuit including back-up lights mounted on said vehicle, and
   (c). A vehicle electrical connector and plug apparatus mounted on the rear of the vehicle and connected to the vehicle primary power source, and
   (d). An auxiliary lighting and electrical connector apparatus for connection to the rear connector apparatus on said vehicle, which auxiliary apparatus comprises:
   (e). A housing, and (f). At least one support member secured within said housing and having formed in said support member a plurality of apertures, each adapted to receive one of a plurality of electrical connecting members, and (g). A first electrical connecting member secured within, and extending through, said support member and connected with the vehicle operating power source activated by engaging the reverse gear of the vehicle, and (h). A second electrical connecting member mounted and extending through an aperture of said support member and connected to the constant full voltage full power source.

4. The auxiliary lighting apparatus as set forth in claim 1 and including (a). A second switch apparatus connecting said auxiliary light directly to the constant full voltage source of the vehicle power supply and by-passing said relay switch, (b). said second switch being constructed and arranged for selective operation of said switch to by-pass said relay switch and enable activation of said auxiliary light without engagement of the vehicle reverse gear.

5. The combined electrical lighting and connection apparatus as set forth in claim 3 including, (a). An electrical relay switch apparatus connected to said first electronic connecting member and connected to both the said reverse gear actuated power circuit and the said constant maximum voltage vehicle power circuit and constructed and arranged to deliver full operating current from the vehicle power system when the reverse gear is engaged, and (b). A second switch apparatus connected to said second electronic connecting member and connecting said auxiliary light directly to the constant full voltage source of the vehicle power supply and by-passing said relay switch, (c). Said second switch being constructed and arranged for selective operation of said switch to by-pass said relay switch and enable activation of said auxiliary light without engagement of the vehicle reverse gear.

6. The auxiliary lighting and electrical connection apparatus as set forth in claim 1, including pass-through auxiliary connector apparatus mounted within the end of the housing opposite the end of the housing containing said first support plate and comprising, (a). A second support plate mounted within the end portion of said housing distal said first support plate, and (b). A central opening through said support member, and (c). A pass-through connector guide mounted in said pass-through support plate and extending through said central opening in said support plate, and (d). An electrical connector component for connecting the end of said pass-through connector guide with the vehicle reverse gear primary power voltage source, and (e). A plurality of apertures formed in said second support plate, each of said apertures being adapted to receive one of the plurality of electrical connecting members, and (f). A plurality of towed vehicle electrical connectors, each mounted in one of said apertures and said second support plate, with each of said code vehicle connecting members connected with a pre-selected electrical connection on said towed vehicle.

7. An auxiliary lighting and electrical connector apparatus as set forth in claim 1 and including paragraph, a second switch apparatus connected to said electrical relay switch and to said constant maximum voltage vehicle power circuit, said second switch apparatus constructed and arranged for selective operation to disconnect said electrical relay switch from said constant maximum voltage vehicle power circuit when said vehicle reverse gear is actuated.

* * * * *